March 26, 1963  J. J. TIEMANN  3,083,319
TEMPERATURE RESPONSIVE SYSTEM
Filed Dec. 24, 1959  2 Sheets-Sheet 1

Inventor:
Jerome J. Tiemann,
by John F. Ahern
His Attorney

March 26, 1963  J. J. TIEMANN  3,083,319
TEMPERATURE RESPONSIVE SYSTEM
Filed Dec. 24, 1959  2 Sheets-Sheet 2

Inventor:
Jerome J. Tiemann,
by John F. Ahern
His Attorney.

United States Patent Office 3,083,319
Patented Mar. 26, 1963

3,083,319
TEMPERATURE RESPONSIVE SYSTEM
Jerome J. Tiemann, Burnt Hills, N.Y., assignor to General
Electric Company, a corporation of New York
Filed Dec. 24, 1959, Ser. No. 861,802
11 Claims. (Cl. 317—132)

This invention relates to a temperature responsive system and particularly to such a system utilizing semiconductor devices.

For the thermal protection of electrical equipment such as motors and the like it is desirable to have a temperature responsive system which is inexpensive and which will fail safe on a broken lead. Most prior devices require a very close tolerance circuit interrupting means due to the gradual and small magnitude changes in the voltage or current on which they are required to operate. In addition, many prior systems have extremely low output and therefore require amplifying devices in order to effect the circuit interruption which contributes to the cost and complication of the system.

It is an object of this invention, therefore, to provide a new and improved temperature responsive system which will fail safe on a broken lead.

It is a further object of this invention to provide a temperature responsive system utilizing noncritical components.

It is a further object of this invention to provide a temperature responsive system which is simpler and less expensive than prior arrangements.

It is another object of this invention to provide a temperature responsive circuit for producing a control signal.

Briefly stated in accord with one aspect of this invention a temperature responsive system is provided utilizing a narrow junction semiconductor device as the temperature sensing element. Means, including a voltage source, are provided for biasing the semiconductor device to a point of stable operation. Utilization means across the semiconductor and responsive to the voltage condition thereof provides circuit making and circuit breaking operations in accordance with predetermined temperature conditions of the semiconductor device.

The device utilized in this invention consists of a junction type degenerate semiconductor device having a negative resistance region in the forward low voltage portion of its current-voltage characteristic. This region is in the forward voltage range of less than 1 volt. Such a device may be formed by alloying a quantity of material containing donor or acceptor impurities to a body of degenerate semiconductor of one-conductivity type to form a recrystallized region therein of opposite-conductivity type by techniques known in the art. By this method a narrow junction may be formed. By a "degenerate semiconductor" is meant a body of semiconductor, to which has been added sufficient donor impurity so that the Fermi-level for the electrons is higher in energy than the conduction band edge; or to which has been added sufficient acceptor impurity so that the Fermi-level has been depressed to a lower energy than the valence band edge. Usually to make a semiconductor degenerate the impurity concentration must be greater than $10^{18}$ atoms per cubic centimeter.

When a junction is formed, therefore, between N and P-type conductivity material containing excess donor and acceptor concentrations respectively greater than $10^{18}$ atoms per cubic centimeter a narrow junction is formed usually having a width of less than 200 angstrom units, and the device exhibits a negative resistance in the forward low voltage region of its current-voltage characteristic. As used herein a narrow junction semiconductor device refers to a semiconductor device having excess donor and acceptor concentrations on either side of the junction so that both the N-type side and the P-type side of the junction are degenerate and exhibiting a negative resistance at low forward voltage.

For further details concerning the semiconductor device utilized in this invention reference may be had to my copending application Serial No. 858,995, filed December 11, 1959, now abandoned, and assigned to the assignee of the present application.

It has been found that the peak current of such a device at low forward voltage depends upon its temperature. Depending upon the semiconductor from which the device is fabricated, this peak current can be either an increasing or a decreasing function of temperature. "Peak current" as used herein refers to the maximum current just before the negative resistance region of the characteristic of the device. I have found that with proper cooperating circuitry the above semiconductor device may be utilized in a simple, temperature responsive system. A particularly suitable narrow junction semiconductor device whose peak current is a decreasing function of its temperature is fabricated from gallium antimonide.

My invention will be better understood from the following description taken in connection with the accompanying drawings and its scope will be apparent from the appended claims.

Figure 1:
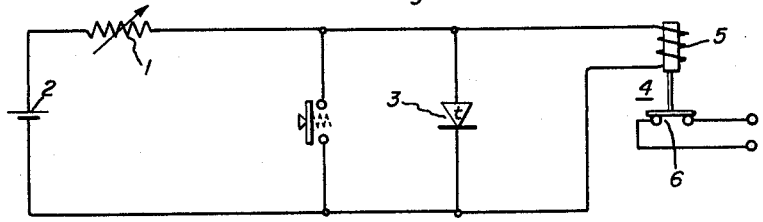
FIG. 1 is a schematic illustration of one embodiment of this invention.

Referring now to FIG. 1, resistance 1 is connected in series with a voltage supply source 2, and a narrow junction semiconductor diode device 3. Utilization means such as relay 4 is connected across the diode and is responsive to the voltage thereof. Relay 4 includes winding 5 and a pair of contacts 6. The diode 3 is associated with the equipment to be protected and is utilized as a temperature sensing device. The above are the only circuit components required by this new temperature responsive system.

This system is suitable for the thermal protection of all types of equipment and in particular for equipment where it is desired to have protection or warning equivalent to the protection or warning associated with overheating in the event of a broken lead in the system.

Having set forth the circuit configuration of FIG. 1, its operation can now be considered. The semiconductor 3 is biased to its low voltage condition by suitable adjustment of variable resistance 1. As shown by the operating characteristic in FIG. 2 this is a condition of low voltage and high current output.

In the system of FIG. 1 the operating point for a particular bias condition is determined by the load line. The slope is negative since the load line shows the voltage available at the terminals of the device as a function of the current through the device. The operating point, then, can be determined from the intersection of the load line with the current-voltage characteristic of the semiconductor. Changing the bias on the semiconductor changes the position of the operating point and thereby varies the temperature at which the device will switch from one voltage condition to another. The load line and bias adjustment are selected so that the operating point is bistable. This means the load line must intersect the characteristic curve in two positive resistance regions. The operating point therefore, lies on a positive resistance region of the characteristic and the slope of the load line is such that it intersects the other positive resistance region of the characteristic curve to provide two stable operating points.

Figure 2:
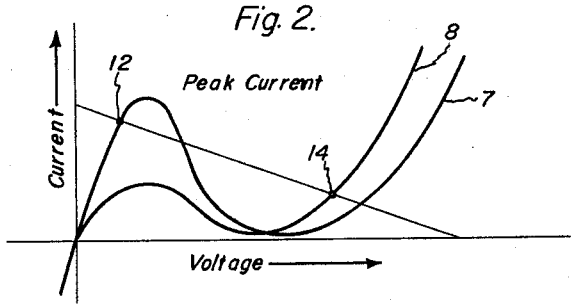
FIGS. 2 and 3 show the operating characteristic of the semiconductor device utilized in this invention.

In FIG. 2 curve 7 illustrates the current-voltage characteristic of the semiconductor device at a lower temperature while curve 8 illustrates the characteristic of the device at a higher temperature. It can be seen that the peak current at low forward voltage varies inversely as the temperature of the semiconductor device.

In the system of FIG. 1 the slope of the load line is substantially determined by the resistance of relay winding 5. The setting of the bias adjusting means determines the position of the operating point on the characteristic curve of the semiconductor. While the source impedance alone can determine a load line, it is convenient, to assure that a stable operating point is defined, to provide a load impedance across the diode. This may be the impedance of the particular utilization means, such as the impedance of the relay winding 5 in FIG. 1, or a separate impedance if the utilization means itself does not provide sufficient load to determine a suitable load line.

Figure 3:
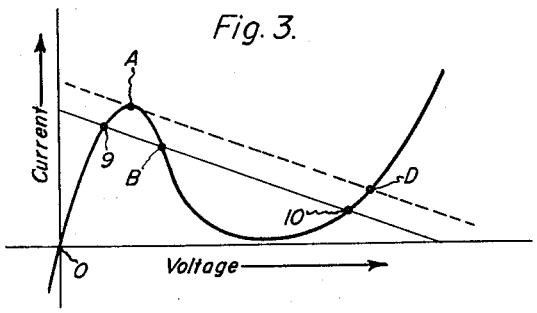

A brief analysis of FIG. 3 shows that point B is a point of unstable equilibrium and points 9 and 10 are points of stable equilibrium. For example, if the current and voltage have values corresponding to point B, any small increase of current due to any cause is accompanied by a decrease of voltage across the semiconductor device. More voltage is thus made available to send current through the resistance resulting in a further rise in current. The action is cumulative and the current rises until the point 9 is reached. Any further increase of current above that corresponding to point 9 would necessarily be accompanied by an increase in voltage across the semiconductor device. The voltage across the resistance would therefore have to fall which could only be true if the current became smaller. The current would, therefore, return to the value corresponding to point 9. Similarly, any small initial decrease in current from the value corresponding to point B becomes cumulative and the current falls to that of point 10.

If the applied voltage is gradually raised from zero, for example, the intersection of the load line with the characteristic curve moves along the branch OA of the curve of FIG. 3. When the intersection is at point A, however, an infinitesimal further increase of voltage causes the current to fall abruptly to the point D. The device, therefore, switches from a low voltage condition shown by point A to a higher voltage condition shown by point D. Switching will occur, therefore, whenever the operating point moves to the unstable region of the characteristic.

Assuming initially that the diode 3 is at a predetermined safe operating temperature and variable resistance 1 is adjusted to provide an operating point which is stable, such as shown at 12 in FIG. 2.

As the temperature of the diode increases its peak current decreases such that at some higher temperature its characteristic would be as shown at 8. This change in the peak current of the device causes the operating point to be moved up until, at a second predetermined temperature, it is above the knee of the characteristic curve. As shown hereinbefore, since this is an unstable position the device instantaneously shifts to the other stable operating point shown at 14, and a higher voltage condition. Thus, by choosing an appropriate load line the semiconductor device will switch from its low voltage condition to its higher voltage condition whenever a particular temperature is exceeded.

When switching occurs there is an instantaneous large magnitude change in voltage across the diode which can be utilized to perform the desired circuit breaking operation. The temperature at which such switching occurs is determined by the position of the operating point on the characteristic curve which can be changed by varying the bias on the semiconductor. Energization of relay 4 causes contacts 6 to be separated and the external circuit to be interrupted, cutting off the power to the equipment. The system is reset after a safe temperature has been restored by momentarily closing push-button 15.

The voltage change due to the switching of the semiconductor device may be utilized other than to actuate a relay directly as described herein. For example, an amplifier or other utilization device may be used. It is required, however, that sufficient load impedance be provided to determine a load line having a slope such that it will intersect the characteristic in at least two positive resistance regions. Further, the operating point must be stable and, therefore, must lie on the positive resistance region of the characteristic.

Figure 4:
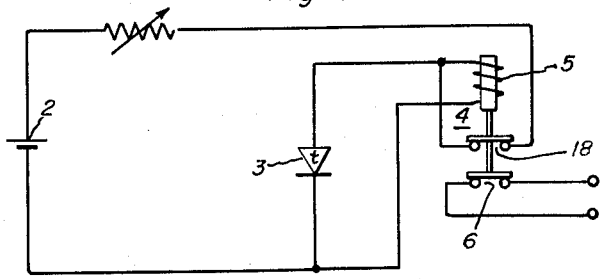
FIG. 4 is a schematic illustration of a modification of the system of FIG. 1.
Figure 5:
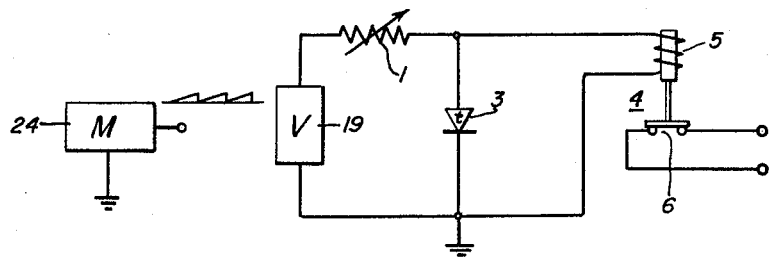
FIG. 5 is a schematic illustration of an embodiment of this invention utilizing an alternating current source.

FIGS. 4 and 5 show modifications of the system of FIG. 1 and provide a system which will be automatically reset when the equipment returns to a safe operating temperature.

The arrangement of FIG. 4 utilizes a pair of contacts 18 in series with the system and responsive to the condition of the utilization means. At safe operating temperatures contacts 6 and contacts 18 are in the closed position shown in FIG. 4. Whenever the predetermined temperature is exceeded relay 4 is energized interrupting the external circuit through separation of contacts 6 and also interrupting the circuit of the system through contacts 18. As soon as contacts 18 are opened, however, relay 4 is de-energized which momentarily completes the circuit of the system. This results in a "chattering" of the relay contacts. By damping the control contacts, they remain open while the relay chatters and closed when the relay remains de-energized. In this way the system is automatically reset as soon as the predetermined safe operating temperature obtains.

The circuit of FIG. 5 shows the system of FIG. 1 utilizing an alternating current voltage source.

The semiconductor diode device is connected to a source of alternating current generally designated at 19 and is biased for operation such that at the safe operating temperatures the alternating current swing never exceeds the peak current of the diode. The path of operation, for example, is along the portion of the curve 20, 21 of FIG. 6. Since this portion of the curve is approximately linear, very little rectification of the alternating current by the diode occurs, resulting in only a small direct current output.

Figure 6:
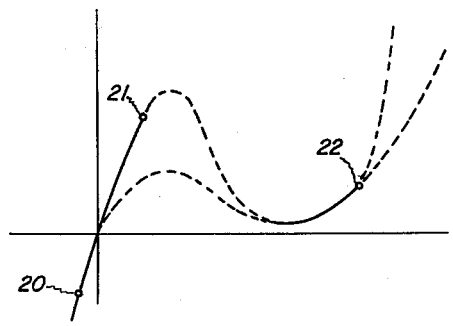
FIG. 6 is the characteristic of the device used in this invention illustrating the path of operation for the embodiment shown in FIG. 5.
Figure 6A:
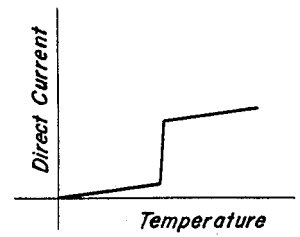
FIG. 6a is a curve illustrating the direct current output of the device.

When the predetermined temperature is exceeded the characteristic shifts such that the alternating current swing causes switching at the forward peak current. The path of operation is now as shown in FIG. 6 along the portion 20—22. There is a discontinuous change in the rectification of the alternating current and considerable direct current is developed. This is because the characteristic between points 20 and 22 is much more non-linear than the portion of the curve between points 20 and 21. In addition, since the diode is reset once each cycle, as soon as the safe temperature obtains, the path will return to that corresponding to points 20, 21 of FIG. 6 which again provides only a very small direct current output. The direct current output of the narrow junction semiconductor device as a function of its temperature is shown in FIG. 6a. This illustrates the discontinuous change in the rectification of the alternating current caused by the switching of the device and change in path of operation.

The utilization means is sensitive to the direct current voltage or to the peak voltage on the diode. Again a small temperature change produces a large discontinuity in the input voltage to the utilization means to provide the desired circuit making and circuit breaking operations.

The system of FIG. 5 can be made to provide a continuously variable output which indicates how far from a desired temperature the actual temperature is and whether or not the temperature is higher or lower than a specified value.

In accord with this aspect of my invention, therefore, the alternating current source is amplitude modulated, such as by a saw tooth or triangular wave form, or superimposed upon a wave form of lower frequency. This may be provided in any conventional manner by a modulating means generally designated at 24. The average direct current output of the semiconductor device is then somewhere between the two extremes which were obtained when the system was fed from an unmodulated alternating current source.

Figure 7:
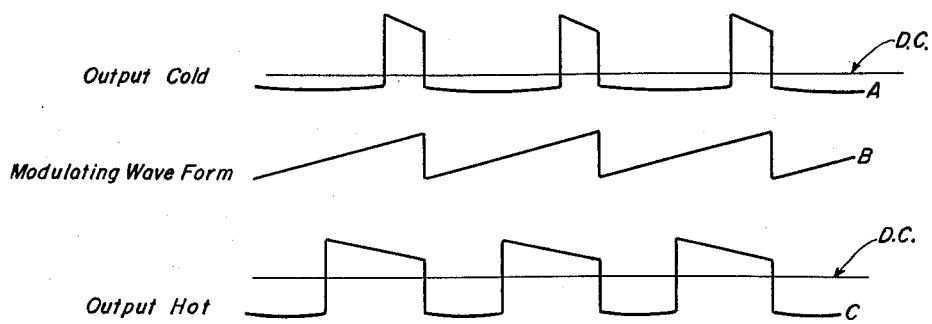
FIG. 7 is a graphical representation of voltage output wave forms of the semiconductor device when the system is fed from a modulated alternating current voltage source.

The semiconductor device is biased so that when it is at a predetermined safe operating temperature condition the modulated current will exceed the peak current of the device only for a predetermined time during each modulation cycle. During this portion of the modulation cycle, the operating point of the device shifts to the higher voltage state and produces a large direct current output for an interval during each cycle. This output is shown at A in FIG. 7. As the temperature of the semiconductor device increases the characteristic shifts because of the lowering of the peak current of the device with increase in temperature. The value of the average D.C. output likewise shifts since now the point in the cycle of modulation where the current exceeds the peak current of the semiconductor device is earlier. A direct current output is thus produced for a longer period of time during each cycle of the modulated alternating voltage than was the case when the device was at its predetermined safe operating temperature.

This results since the peak current of the device decreases with increase in temperature and the modulated voltage swing causes this peak current to be exceeded at an earlier period during the cycle. As shown hereinbefore when the peak current is exceeded there is a discontinuous change in the rectifying properties of the device and a direct current output is produced. The average D.C. output will, therefore, be as shown in C, FIG. 7.

An error signal is thus available which depends on the temperature of the semiconductor device. This control signal may be utilized in various controls and control systems known in the art.

My invention further provides that under the condition of a broken lead at the semiconductor the utilization means will be presented with a condition similar to the high voltage condition of the device. The voltage impressed across the load, therefore, will be such that the utilization means can be energized and the external circuit will be interrupted. An open lead will cause interruption of the circuit the same as an excessively high temperature and the system thus provides protection on a broken lead in addition to protection due to excessive temperature.

This invention offers circuit simplicity and economy of components. When the predetermined temperature is exceeded there is an instantaneous large magnitude voltage change at the relay of other utilization means. The utilization means can be non-critical since it operates on a high ratio of voltages at the two conditions of the semiconductor device.

While only certain preferred features of the invention have been shown by way of illustration many modifications will occur to those skilled in the art and it is, therefore, to be understood that the appended claims are intended to cover all such modifications as fall within the true spirit and scope of this invention.

What I claim as new and desire to secure by Letters Patent of the United States is:

1. A temperature responsive system comprising: a narrow junction semiconductor diode having a peak current value at low forward voltages which depends upon its temperature, an alternating current voltage source, means in circuit with said voltage source and said diode defining a load line having two stable operating points, means biasing said diode for operation such that its peak current is not exceeded by the alternating current swing at a first predetermined temperature condition and is exceeded at a second predetermined higher temperature, and utilization means responsive to the direct current output of said diode.

2. A temperature responsive system comprising: a narrow junction semiconductor diode having a peak current at low forward voltage which varies inversely with its temperature, an alternating current voltage source, means in circuit with said voltage source and said diode defining a load line having two stable operating points, means biasing said diode for operation such that its peak current is not exceeded by the alternating current swing at a first predetermined temperature condition and is exceeded at a second predetermined higher temperature condition, and utilization means responsive to the direct current output of said diode to provide a circuit making operation whenever said first predetermined temperature condition obtains and a circuit breaking operation whenever said second predetermined temperature condition obtains.

3. A temperature responsive system comprising: a narrow junction semiconductor diode having a peak current at low forward voltage which varies inversely with its temperature, an amplitude modulated alternating current voltage source, means in circuit with said voltage source and said diode defining a load line having two stable operating points, means biasing said diode for operation such that at a first predetermined temperature its peak current is exceeded for a predetermined time during each modulation cycle providing a time average direct current output of said diode which depends on the deviation from said first predetermined temperature.

4. A circuit for providing a continuously variable signal output which is proportional to the deviation from a predetermined temperature, the circuit comprising: a narrow junction semiconductor device having a peak current at low forward voltages which varies inversely with its temperature, an amplitude modulated alternating current voltage source, means in circuit with said voltage source and said device defining a load line having two stable operating points, means biasing said device for operation such that at a first predetermined temperature its peak current is exceeded for a predetermined time during each modulation cycle of the alternating current voltage source, and utilization means for sensing during what portion of the modulation cycle the alternating current exceeds the peak current of said device.

5. A temperature responsive system comprising: a narrow junction semiconductor diode device having a peak current value which depends upon its temperature; an alternating current voltage source; means coupling said diode device to said voltage source and establishing a load line for said diode device which has a slope defining two stable operating points; means for controlling the position of the load line so established with respect to the peak current of said diode device so that said peak current is not exceeded by the alternating current swing at a first predetermined temperature condition and is exceeded at a second predetermined temperature condition; and utilization means coupled to said diode device and responsive to the direct current output thereof.

6. The temperature responsive system of claim 5 wherein the peak current of said semiconductor diode device increases with an increase in temperature.

7. The temperature responsive system of claim 5 wherein the peak current of said semiconductor diode device decreases with an increase in temperature.

8. The temperature responsive system of claim 7 wherein the narrow junction semiconductor diode device is fabricated from gallium-antimonide.

9. A temperature responsive circuit comprising: a narrow junction semiconductor diode device having a peak current value which depends upon the temperature of said device; an alternating current voltage source; means coupling said diode device to said voltage source to establish a load line for said diode device having two stable operating points; means for superimposing a slowly varying waveform on said alternating current voltage source to cause the modulation thereof; means for biasing said diode device for operation such that at a first predetermined temperature the peak current thereof is exceeded for a predetermined time during each modulation cycle of the alternating current voltage source; and means for determining during what portion of the modulation cycle the alternating current exceeds the peak current value of said diode device to provide a continuously variable signal output which is proportional to the deviation from said predetermined temperature.

10. The temperature responsive circuit of claim 9 wherein the peak current value of said semiconductor diode device increases with increase in temperature.

11. The temperature responsive circuit of claim 9 wherein the narrow junction semiconductor diode device is fabricated from gallium-antimonide and the peak current value thereof decreases with increase in temperature.

References Cited in the file of this patent

UNITED STATES PATENTS

| | | |
|---|---|---|
| 2,604,496 | Hunter | July 22, 1952 |
| 2,697,195 | Courtney | Dec. 14, 1954 |
| 2,726,312 | Dunlap | Dec. 6, 1955 |
| 2,929,968 | Henisch | Mar. 22, 1960 |